US006218756B1

United States Patent
Gardner et al.

(12)

(10) Patent No.: US 6,218,756 B1
(45) Date of Patent: Apr. 17, 2001

(54) GENERATOR ROTOR SLOT TIGHTENING METHOD AND ASSOCIATED APPARATUS

(75) Inventors: William C. Gardner, RockHill, SC (US); Calvin L. Paris, Orlando; Raul R. Rico, Oviedo, both of FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/428,880

(22) Filed: Oct. 28, 1999

(51) Int. Cl.$^7$ ........................................................ H02K 3/48
(52) U.S. Cl. ............................ 310/214; 310/214; 310/215
(58) Field of Search .................................... 310/214, 215, 310/261; 29/596–598

(56) References Cited

U.S. PATENT DOCUMENTS

| | | | |
|---|---|---|---|
| 3,976,901 | * 8/1976 | Liptak et al. | 310/214 |
| 4,369,389 | * 1/1983 | Lambrecht | 310/214 |
| 4,387,316 | * 6/1983 | Katsekas | 310/214 |
| 4,469,971 | * 9/1984 | Moore | 310/214 |
| 4,633,116 | * 12/1986 | Derderian | 310/214 |

* cited by examiner

Primary Examiner—Tran Nguyen

(57) ABSTRACT

A method and associated apparatus (10) are provided for tightening slot wedges (32, 36) of a generator rotor. The method preferably includes the steps of positioning an electrically-conductive slot tightening member (25) within a recess (20) formed in at least one slot filler member (12, 16) positioned within a rotor slot (18) and positioning at least two end portions of electrically-conductive slot wedges (32, 36) to overlie the recess (20) and abuttingly contact at least portions of the slot tightening member (25) so that an electrically-conductive path is provided from one of the at least two end portions of the slot wedges (32, 36), through the slot tightening member (25), and to another one of the at least two end portions of the slot wedges (32, 36). The apparatus (10) preferably includes at least one slot filler member (12) for positioning within a rotor slot (18). The at least one slot filler member (12) has a recess (20) formed therein. An electrically-conductive slot tightening member (25) is positioned within the recess (20), and at least two electrically-conductive slot wedges (32, 36) are positioned so that respective end portions thereof overlie the recess (20) so that an electrically-conductive path is provided from one of the respective end portions of the slot wedges (32, 36), through the slot tightening member (25), and to another one of the respective end portions of the slot wedges (32, 36).

23 Claims, 2 Drawing Sheets

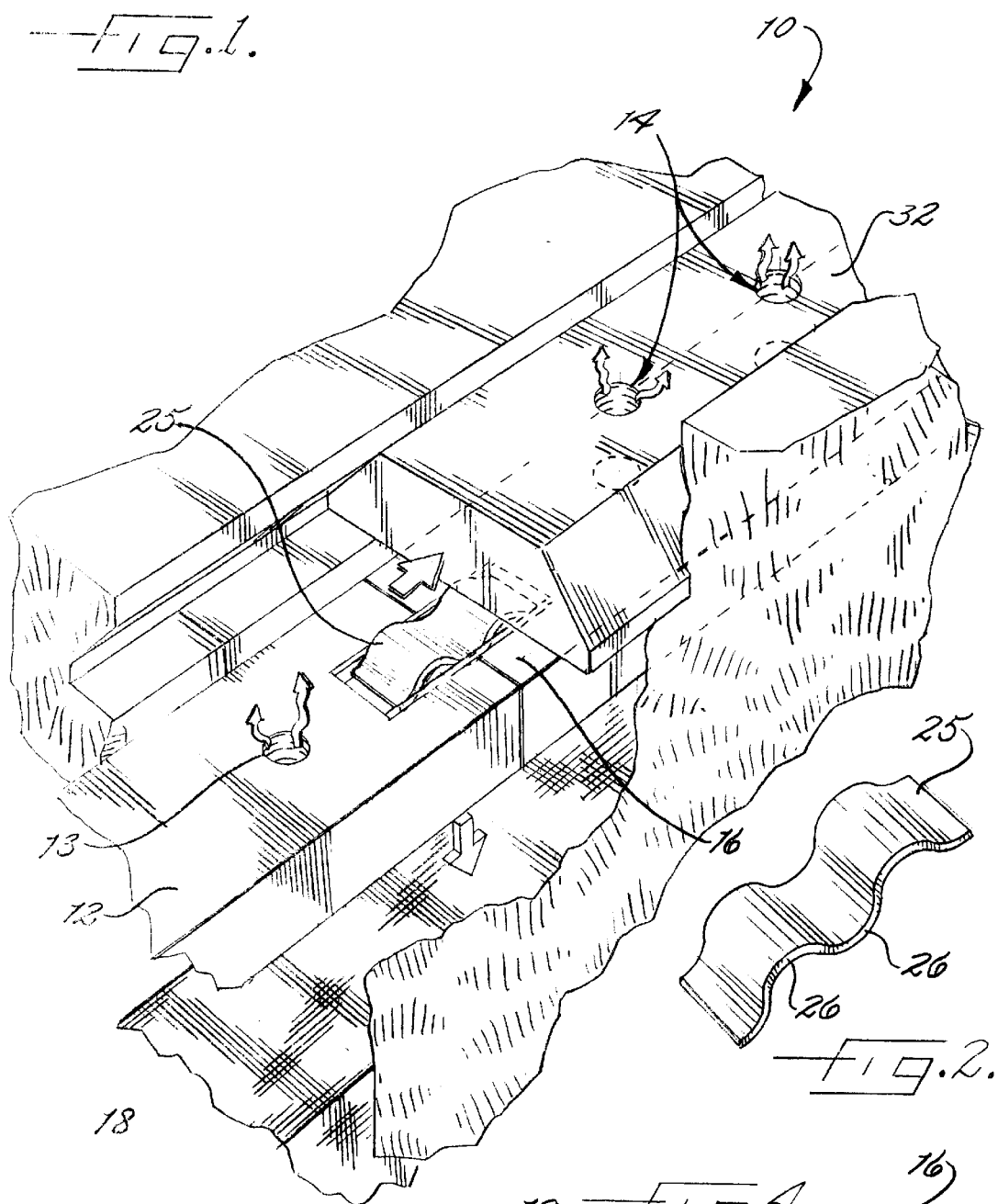

GENERATOR ROTOR SLOT TIGHTENING METHOD AND ASSOCIATED APPARATUS

FIELD OF THE INVENTION

This invention is related to the power generation industry and, more particularly, to the field of power generators.

BACKGROUND OF THE INVENTION

In the power generation industry, as well understood by those skilled in the art, a power generator has a generator rotor and a generator stator. The generator rotor includes several rotor slots. The rotor slots conventionally have a plurality of electrically-conductive rotor wedges which hold the slot contents, e.g., coils, slot filler, within the slots. The slot contents should remain tight to prevent relative motion of the copper windings during slow roll operations which could result in wear of the windings and conductive particle creation, e.g., copper dusting. A tight slot contents also ensures the provision of adequate contact pressure on a damper system of the rotor, e.g., a wedge and rotor tooth, at low speeds to conduct currents generated with static start operation. The tightening of the slot contents is even further problematic between rotor slot wedges.

A conventional method for tightening the slot is to use a brute force technique which can be labor intensive. In this conventional method, all of the slots are gauged along the length. Slot fillers are then sanded to fit, and wedges are driven into the slot with a large hydraulic ram. The filler thickness under a given wedge is chosen by trial and error. If the filler is sanded too thin, the slot will be loose. If the filler is too thick, galling can occur when the wedge is driven into the slot. Tolerances between "too thin" and "too thick" can be too great and cause problems for the rotor. This method also allows the slot to loosen as the machine ages and insulation components creep with time.

Systems, such as shown in U.S. Pat. No. 5,430,340 by Shih et al. titled "Harmonic Current Path Spring Device Between Retaining Ring And Rotor Wedge Of A Dynamoelectric Generator," have been developed which use a spring below rotor slot wedges to bias the wedges against overlapping retaining rings. Such systems, however, fail to adequately address some of the above described problems and particularly the problem with loose contents between wedges.

Other systems have been developed, such as shown in U.S. Pat. No. 5,550,417 by Morrison et al. titled "Amortisseur Winding Arrangement, In A Rotor For Electrical, Rotating Equipment," which attempt to solve the problem of loose slot contents between wedges by physically and electrically connecting the wedges. Such a system uses arcuate linking members or inserts which are spring loaded to assist in retaining the wedges. The physical connection of the wedges and the custom forming of the wedges, however, are often not desirable.

SUMMARY OF THE INVENTION

In view of the foregoing, the present invention advantageously provides a method of tightening a generator rotor slot and an associated apparatus which does not require the physical connection of slot wedges or the custom forming of a wedge interface. The present invention also advantageously provides a method of tightening a generator rotor slot which uses slot filler members to assist in the tightening of or maintaining the tightness of the contents of the rotor slot. The present invention further advantageously provides a method and apparatus for tightening a generator rotor slot which effectively accommodates creep of components in time.

More particularly, a method for tightening slot wedges of a generator rotor is provided which preferably includes the steps of positioning an electrically-conductive slot tightening member within a recess formed in at least one slot filler member positioned within a rotor slot and positioning at least two end portions of electrically-conductive slot wedges to overlie the recess and abuttingly contact at least portions of the slot tightening member so that an electrically-conductive path is provided from one of the at least two end portions of the slot wedges, through the slot tightening member, and to another one of the at least two end portions of the slot wedges.

Another method of tightening a rotor slot preferably includes forming a recess in at least one slot filler member, positioning the at least one slot filler member within a rotor slot, positioning an electrically-conductive slot tightening member within the recess formed in at least one slot filler member, and positioning at least two end portions of electrically-conductive slot wedges to overlie the recess so that an electrically-conductive path is provided from one of the at least two end portions of the slot wedges, through the slot tightening member, and to another one of the at least two end portions of the slot wedges.

The present invention additionally provides a rotor slot tightening apparatus which preferably includes at least one slot filler member for positioning within a rotor slot. The at least one slot filler member has a recess formed therein. An electrically-conductive slot tightening member is positioned within the recess, and at least two electrically-conductive slot wedges are positioned so that respective end portions thereof overlie the recess so that an electrically-conductive path is provided from one of the respective end portions of the slot wedges, through the slot tightening member, and to another one of the respective end portions of the slot wedges.

By forming recesses in slot filler members, the present invention takes advantage of the existing material conventionally used in maintaining or tightening a rotor slot without the necessity of developing extensive physically connecting members or other extensive arrangements which can be costly to tool or manufacture, especially where low quantities are concerned. This can also greatly reduce manufacturing time and costs associated therewith. The insulating channel positioned within the recess advantageously provides a barrier or buffer from the electrically conductive path formed from the slot wedges and the slot tightening member to enhance protection of the slot contents.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 1 is a perspective view of a slot tightening apparatus which allows a generator slot to be tightened according to the present invention;

FIG. 2 is a perspective view of a first embodiment of a tightening member of a rotor slot tightening apparatus according to the present invention;

FIG. 3 is a side elevational view of a first embodiment of a tightening member of a rotor slot tightening apparatus according to the present invention;

FIG. 4 is a top plan view of a slot tightening apparatus prior to the positioning of slot wedges thereon according to the present invention;

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the illustrated embodiments set forth herein.

Rather, these illustrated embodiments are provided so that this disclosure will be thorough and complete, and will fully convey the scope of the invention to those skilled in the art. Like numbers refer to like elements throughout, and prime and double prime notation, if used, indicate similar elements in alternative embodiments.

Figure 5:
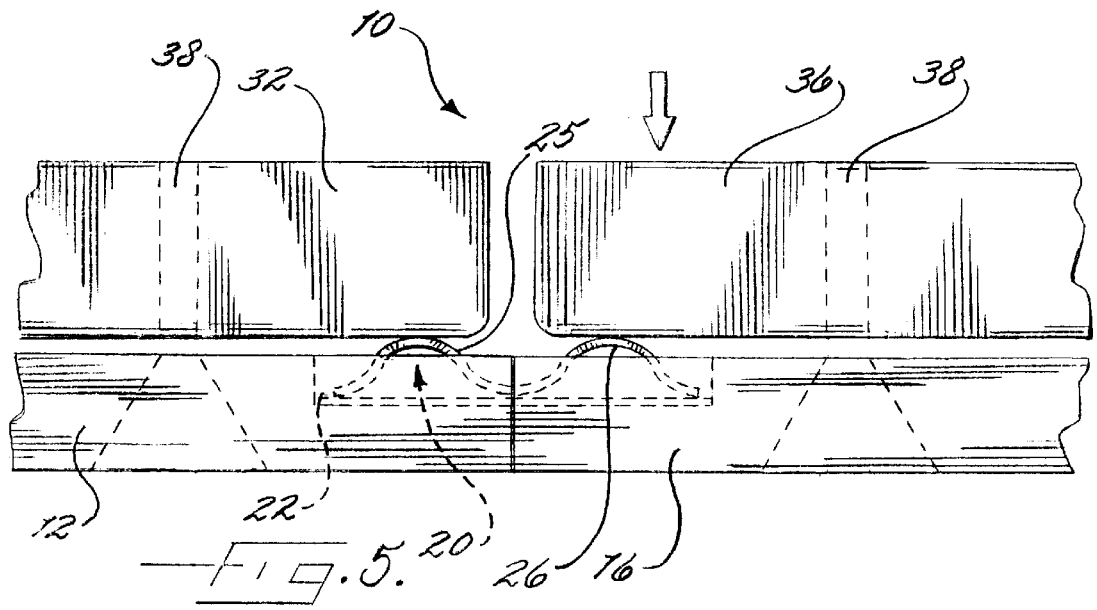
FIG. 5 is a side elevational view of a slot tightening apparatus being positioned to tighten slot contents according to the present invention.
Figure 6:
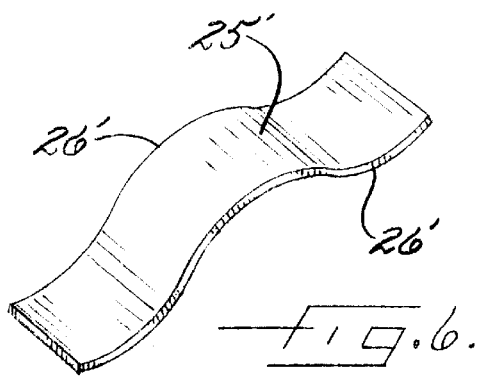
FIG. 6 is a perspective view of a second embodiment of a tightening member of a rotor slot tightening apparatus according to the present invention.
Figure 7:
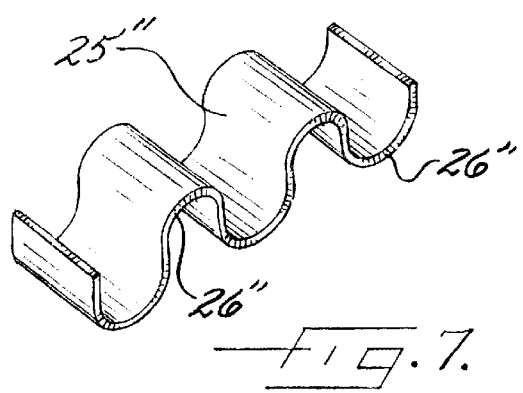
FIG. 7 is a perspective view of a third embodiment of a tightening member of a rotor slot tightening apparatus according to the present invention.

FIGS. 1 and 5 illustrate a slot tightening apparatus 10 and methods for tightening contents of a rotor slot 18 according to the present invention. The apparatus 10 preferably includes at least one slot filler member 12, 16 for positioning within a rotor slot 18, as well understood by those skilled in the art. The slot filler member 12, 16 preferably has a recess 20 formed therein. As illustrated, the recess 20 is preferably defined by a portion of a recess in a first slot filler member 12, a portion of a recess in a second slot filler member 16, and the first and second slot filler members 12, 16 being positioned in an end-to-end relationship so that the combination of the first and second recess portions thereby define the recess 20. An electrically-conductive slot tightening member 25, e.g., preferably provided by a spring, is positioned within the recess of the slot filler member. The spring 25 is preferably formed of a sheet of material, e.g., preferably provided by a metal material, and has one or more arcuate undulations 26 therein. Examples of such springs 25, 25', 25" can be seen in the three embodiments of FIGS. 2–3 and 6–7.

The apparatus 10 also preferably includes at least two electrically-conductive slot wedges 32, 36 preferably positioned within wedge grooves formed in the side peripheries of the slots (see FIG. 1) so that respective end portions thereof overlie and preferably abuttingly contact at least portions of the slot tightening member 25 positioned in the recess 20 of the slot filler members 12, 16 so that an electrically-conductive path is provided from one of the respective end portions of the slot wedges 32, through the slot tightening member 25, and to another one of the respective end portions of the slot wedges 36 (see FIGS. 1 and 4–5). As shown in FIG. 5, the slot tightening member 25 is preferably at least partially compressed when the wedges 32 are placed or fitted into an overlying position. The recess 20 within the filler members 12, 16 is also preferably deep enough with respect to the height of the spring 25 when positioned in the recess 20 to prevent the spring 25 from being totally compressed to a flat position, e.g., by rotational force, during operation of the generator rotor.

At least one insulating channel 22 is also preferably positioned within the recess 20 of the at least one slot filler member 12, 16 to provide an insulated barrier or buffer from the electrically conductive path formed from the slot wedges 32, 36 and the slot tightening member 25 to enhance protection of the slot contents. Likewise, the insulating channel 22 is preferably defined by forming a portion of an insulating channel in each of the first and second recess portions so that the combination of the first and second insulating portions thereby define the insulating channel 22 (see FIGS. 4–5). Also, the at least one insulating channel 22, e.g., formed of an insulating material such as glass or other materials as understood by those skilled in the art, advantageously preferably underlies the slot tightening member 25, can also even be positioned along side peripheries of the recess 20, if desired, and preferably extends longitudinally the substantial distance of the longitudinal extent of the recess 20. The spring 25 is preferably formed of a metal material and is preferably positioned to overlie the insulating channel 22 and spaced from side peripheries of the recess 20.

In an alternate embodiment, the spring 25 can also be formed of a glass or other non-conducting material so that an electrical path is then only provided between the wedges 32, 36 through the surrounding portions, e.g., teeth, or the rotor. For example, the wedges 32, 36 are conductive and the surrounding portions of the rotor are conductive so that the surrounding portions of the rotor provide the desired electrically conductive path between the wedges 32, 36. In this alternate embodiment, the insulating channel would not be necessary because the spring would not be conductive. The first embodiment wherein the spring 25 is formed of a conductive material, however, is preferable in many situations because this additional electrical path through the spring 25 to the other wedge is often desirable as well.

As illustrated in FIGS. 1 and 4–5, the slot filler members 12, 16 and the slot wedges 32, 36 can also include one or more air or venting passageways or openings 13, 14 formed therein to allow air or other gases to vent or circulate therethrough. The venting openings 13, 14, for example, can extend all the way through the wedges 32, 36 and filler members 12, 16 so that the openings therein are axially aligned or, alternatively, can only extend through the wedges and partially through the filler members if desired.

As illustrated in FIGS. 1–7, the present invention also provides methods of tightening a rotor slot of a power generator. A method preferably includes the steps of positioning an electrically-conductive slot tightening member 25 within a recess 20 formed in at least one slot filler member 12, 16 positioned within a rotor slot 18 and positioning at least two end portions of electrically-conductive slot wedges 32, 36 to overlie the recess 20 and abuttingly contact at least portions of the slot tightening member 25 so that an electrically-conductive path is provided from one of the at least two end portions of the slot wedges 32, 36, through the slot tightening member 25, and to another one of the at least two end portions of the slot wedges 32, 36.

The method can also include providing at least one insulating channel 22 within the recess of the at least one slot filler member 12, 16 and forming a portion of a recess in a first slot filler member 12, forming a portion of a recess 20 in a second slot filler member 16, and positioning the first and second slot filler members 12, 16 in an end-to-end relationship so that the combination of the first and second recess portions define the recess 20. The at least one insulating channel 22 which includes a pair of generally parallel and spaced-apart insulating channels extending longitudinally the substantial distance of the longitudinal extent of the recess 20. The method can additionally include positioning the slot tightening member 25 between the pair of insulating channels 22.

Still further the method can also include the step of providing an insulating channel 22 includes forming a portion of an insulating channel 22 in each of the first and second recess portions so that the combination of the first and second portions of an insulating channel 22 define the insulating channel 22. The slot tightening member 25 preferably includes a spring 25, and the spring 25 is preferably formed of a sheet of material and has one or more arcuate undulations therein. Also, the recess 20 is deep enough with respect to the height of the spring 25 when positioned in the recess 20 to prevent the spring 25 from being totally compressed to a flat position during operation of the rotor. The spring 25 is preferably formed of a metal material, and the method can further include securing the at least two end portions of slot wedges 32, 36 to the at least one slot filler member 12, 16 (see FIG. 5).

Another method of tightening a rotor slot 18 preferably includes forming a recess 20 in at least one slot filler member 12, 16, positioning the at least one slot filler member 12, 16 within a rotor slot 18, positioning an electrically-conductive slot tightening member within the recess 20 formed in at least one slot filler member 12, 16, and positioning at least two end portions of electrically-conductive slot wedges 32, 36 to overlie the recess 20 so that an electrically-conductive path is provided from one of the at least two end portions of the slot wedges 32, 36, through the slot tightening member 25, and to another one of the at least two end portions of the slot wedges 32, 36. This method can also advantageously include the other steps and/or features of the other method as described above.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed:

1. A slot tightening apparatus for tightening a rotor slot of a generator rotor, the apparatus comprising:
    at least one slot filler member for positioning within a rotor slot, the at least one slot filler member having a recess formed therein;
    an electrically-conductive slot tightening member positioned within the recess of the at least one slot filler member;
    at least two electrically-conductive slot wedges positioned so that respective end portions thereof overlie the at least one slot filler member so that an electrically-conductive path is provided from one of the respective end portions of the slot wedges, through the slot tightening member, and to another one of the respective end portions of the slot wedges.

2. An apparatus as defined in claim 1, wherein the slot tightening member includes a spring, the spring being formed of a sheet of material and has one or more arcuate undulations therein, and the apparatus further comprises at least one insulating channel positioned within the recess of the at least one slot filler member.

3. An apparatus as defined in claim 2, wherein the recess is defined by a portion of a recess in a first slot filler member, a portion of a recess in a second slot filler member, and the first and second slot filler members being positioned in an end-to-end relationship so that the combination of the first and second recess portions thereby define the recess, and wherein the insulating channel is defined by forming a portion of an insulating channel in each of the first and second recess portions so that the combination of the first and second insulating portions thereby define the insulating channel.

4. An apparatus as defined in claim 2, wherein the at least one insulating channel is positioned to at least underlie the slot tightening member and extends longitudinally the substantial distance of the longitudinal extent of the recess, and wherein the slot tightening member is positioned between the pair of insulating channels, and wherein the recess is deep enough with respect to the height of the spring when positioned in the recess to prevent the spring from being totally compressed to a flat position during operation of the rotor.

5. A slot tightening apparatus for tightening a rotor slot of a generator rotor, the apparatus comprising:
    at least one slot filler member for positioning within a rotor slot, the at least one slot filler member having a recess formed therein;
    a slot tightening member positioned within the recess of the at least one slot filler member;
    at least two electrically-conductive slot wedges positioned so that respective end portions thereof overlie the at least one slot filler member so that an electrically-conductive path is provided from one of the respective end portions of the slot wedges, through portions of the rotor slot surrounding the slot wedges, and to another one of the respective end portions of the slot wedges.

6. An apparatus as defined in claim 5, wherein the slot tightening member includes a spring, the spring being formed of a non-conductive material and has one or more arcuate undulations therein.

7. An apparatus as defined in claim 5, wherein the recess is defined by a portion of a recess in a first slot filler member, a portion of a recess in a second slot filler member, and the first and second slot filler members being positioned in an end-to-end relationship so that the combination of the first and second recess portions thereby define the recess.

8. A method for tightening slot wedges of a generator rotor, the method comprising the steps of:
    positioning an electrically-conductive slot tightening member within a recess formed in at least one slot filler member positioned within a rotor slot; and
    positioning at least two end portions of electrically-conductive slot wedges to overlie the recess and abuttingly contact at least portions of the slot tightening member so that an electrically-conductive path is provided from one of the at least two end portions of the slot wedges, through the slot tightening member, and to another one of the at least two end portions of the slot wedges.

9. A method as defined in claim 8, further comprising the step of providing at least one insulating channel within the recess of the at least one slot filler member.

10. A method as defined in claim 9, wherein the at least one insulating channel is positioned to at least underlie the slot tightening member and extends longitudinally the substantial distance of the longitudinal extent of the recess, and wherein the slot tightening member is positioned between the pair of insulating channels.

11. A method as defined in claim 9, further comprising forming a portion of a recess in a first slot filler member, forming a portion of a recess in a second slot filler member, and positioning the first and second slot filler members in an end-to-end relationship so that the combination of the first and second recess portions define the recess.

12. A method as defined in claim 11, wherein the step of providing an insulating channel includes forming a portion of an insulating channel in each of the first and second recess portions so that the combination of the first and second portions of an insulating channel define the insulating channel.

13. A method as defined in claim 12, wherein the slot tightening member includes a spring, the spring being formed of a sheet of material and has one or more arcuate undulations therein.

14. A method as defined in claim 13, wherein the spring is formed of a metal material, and the method further comprises securing the at least two end portions of slot wedges to the at least one slot filler member.

15. A method as defined in claim 8, wherein the slot tightening member includes a spring, and wherein the recess is deep enough with respect to the height of the spring when positioned in the recess to prevent the spring from being totally compressed to a flat position during operation of the rotor.

16. A method for tightening slot wedges of a generator rotor, the method comprising the steps of:
 forming a recess in at least one slot filler member;
 positioning the at least one slot filler member within a rotor slot;
 positioning an electrically-conductive slot tightening member within the recess formed in at least one slot filler member; and
 positioning at least two end portions of electrically-conductive slot wedges to overlie the recess so that an electrically-conductive path is provided from one of the at least two end portions of the slot wedges, through the slot tightening member, and to another one of the at least two end portions of the slot wedges.

17. A method as defined in claim 16, further comprising the step of providing at least one insulating channel within the recess of the at least one slot filler member.

18. A method as defined in claim 17, wherein the at least one insulating channel is positioned to at least underlie the slot tightening member and extends longitudinally the substantial distance of the longitudinal extent of the recess, and wherein the slot tightening member is positioned between the pair of insulating channels.

19. A method as defined in claim 17, further comprising forming a portion of a recess in a first slot filler member, forming a portion of a recess in a second slot filler member, and positioning the first and second slot filler members in an end-to-end relationship so that the combination of the first and second recess portions define the recess.

20. A method as defined in claim 19, wherein the step of providing an insulating channel includes forming a portion of an insulating channel in each of the first and second recess portions so that the combination of the first and second portions of an insulating channel define the insulating channel.

21. A method as defined in claim 20, wherein the slot tightening member includes a spring, the spring being formed of a sheet of material and has one or more arcuate undulations therein.

22. A method as defined in claim 21, wherein the recess is deep enough with respect to the height of the spring when positioned in the recess to prevent the spring from being totally compressed to a flat position during operation of the rotor.

23. A method as defined in claim 22, wherein the spring is formed of a metal material, and the method further comprises securing the at least two end portions of slot wedges to the at least one slot filler member.

* * * * *